Patented Aug. 17, 1948

2,447,194

UNITED STATES PATENT OFFICE 2,447,194

TETRAHYDROPYRANE-4:4-DICARBOXYLIC ACID BIS-DIETHYLAMIDE

Henry Martin and Hans Gysin, Basel, Hans Zaeslin, Riehen, near Basel, and Alfred Margot, Basel, Switzerland, assignors to J. R. Geigy A. G., Basel, Switzerland, a Swiss firm No Drawing. Application October 15, 1943, Serial No. 506,418. In Switzerland December 18, 1942

1 Claim. (Cl. 260—333)

It has been found that amides derived from substituted methylene dicarboxylic acids, wherein one substituent is of heterocyclic character or wherein two substituents together with the methylene group form a heterocyclic ring, and from secondary aliphatic and cycloaliphatic amines respectively containing at least 3 C-atoms constitute very valuable therapeutical compounds.

As substituted methylene dicarboxylic acids falling within the scope of the above definition we may use for instance: furfural malonic acid, tetrahydropyrane dicarboxylic acid (4:4) or N-ethyl- or N-cyclohexyl-2:6-dimethyl piperidine dicarboxylic acid (4:4) and the like.

The new methylene dicarboxylic acid diamides disubstituted in the amide radical are obtained by causing methylene dicarboxylic acids of the above definition or functional derivatives thereof, such as for example their halides, esters or anhydrides, to react with secondary aliphatic or cycloaliphatic amines containing at least 3 C-atoms or their salts, in the presence or absence of solvents, of condensation agents as well as of acid binding agents.

As condensation agents there are advantageously used phosphorus halides, phosphorus pentoxide, thionyl chloride, phosgene and so on.

The new compounds may be used as valuable therapeutics, especially as analeptics; partly they are also suitable as solving assistants. The claim of this application is directed to the preferred compound thereof, the tetrahydropyrane-4:4-dicarboxylic acid bis-diethylamide, which is characterized by its utility as an analeptic.

The present invention is illustrated, but not limited by the following example, wherein the parts are by weight, unless otherwise stated.

EXAMPLE 26.1 parts of tetrahydropyrane-4:4-dicarboxylic acid are treated with 63 parts of phosphorus pentachloride. After having stirred the mixture over night at room temperature it is heated for a short time to 50° C., then distilled in order to separate the phosphorus oxychloride, whereupon the raw acid chloride is dissolved in ether and this solution allowed to drop in the cold into a solution of 50 parts of diethylamine in 200 parts by volume of ether. The diethylamine hydrochloride is then filtered off and the filtrate freed from ether and rectified in high vacuo. Boiling point at 0.15 mm.=153°–154° C. When recrystallised from petroleum ether, the compound, tetrahydropyrane-4:4-dicarboxylic acid bis-diethylamide, melts at 47°–48° C.; it is readily soluble in water and ether.

Instead of the tetrahydropyrane compound, the analogous sulfur compound may be used quite well; the same is prepared, like the pyrane compound, by means of dichloro diethyl ether from dichloro diethyl sulfide and malonic ester.

In the following table some further compounds according to the present invention may be mentioned:

Table malonic acids R(COOH)(COOH)

| No. | R | amine | B. P. (mm.) | form | solubility: w=water e=ether |
|---|---|---|---|---|---|
| 1 | C₂H₅N-CH(CH₃)-CH₂-C(CH₃)-C-CH₂ | HN(C₂H₅)₂ | 125° C. (0.05) | liquid | w easily soluble as hydrochloride. |
| 2 | C₆H₅-N(CH(CH₃)CH₂)₂C | ___do___ | 162–163° C. (0.06) | ___do___ | Do. |
| 3 | O(CH₂CH₂)₂CH-CH | ___do___ | 150–151° C. (0.12) | ___do___ | w soluble, e soluble. |
| 4 | O(CH₂CH₂)₂N-CH₂CH₂-C-CH₃ | ___do___ | 158–160° C. (0.25) | ___do___ | w soluble as hydrochloride. |
| 5 | (furyl)CH=C | ___do___ | 146–148° C. (0.16) | solid M. P. 38–39° C. | w 3% soluble, e soluble. |

What we claim is:

The tetrahydropyrane-4:4-dicarboxylic acid bis-diethylamide of the formula

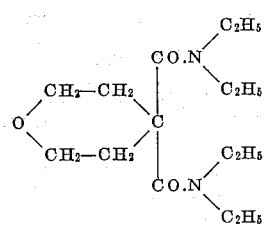

being a white crystalline solid of the melting point 47–48° C. and having analeptic activity.

HENRY MARTIN.
HANS GYSIN.
HANS ZAESLIN.
ALFRED MARGOT.

REFERENCES CITED

The following references are of record in the file of this patent:

UNITED STATES PATENTS

| Number | Name | Date |
|---|---|---|
| 697,730 | Liebrecht | Apr. 15, 1902 |
| 1,073,855 | Hiemeny | Sept. 23, 1913 |
| 1,986,854 | Reid | Jan. 8, 1935 |
| 2,094,608 | Kritchevsky | Oct. 5, 1937 |
| 2,094,609 | Kritchevsky | Oct. 5, 1937 |
| 2,109,941 | D'Alelio | Mar. 1, 1938 |
| 2,130,523 | Carothers | Sept. 20, 1938 |
| 2,130,948 | Carothers | Sept. 20, 1938 |
| 2,084,626 | Tabem | June 22, 1938 |
| 2,304,475 | Pool | Dec. 8, 1942 |
| 2,310,873 | Sauer | Feb. 9, 1943 |

FOREIGN PATENTS

| Number | Country | Date |
|---|---|---|
| 400,452 | Great Britain | Oct. 26, 1933 |
| 201,945 | Switzerland | Mar. 16, 1939 |

OTHER REFERENCES

J. Chem. Soc., pt. 2 (1930), Proceedings pp. 2525–30.

Sidgwick's Organic Chemistry of Nitrogen (1942), pp. 148–150.